(12) United States Patent
Berrada Sounni et al.

(10) Patent No.: US 9,038,421 B2
(45) Date of Patent: May 26, 2015

(54) GLASS-BENDING APPARATUS AND METHOD

(75) Inventors: Amine Berrada Sounni, Berkeley, CA (US); Brian S. Wares, Berkeley, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

(21) Appl. No.: 13/251,053

(22) Filed: Sep. 30, 2011

(65) Prior Publication Data

US 2013/0000357 A1    Jan. 3, 2013

Related U.S. Application Data

(60) Provisional application No. 61/504,147, filed on Jul. 1, 2011.

(51) Int. Cl.
  *C03B 23/025*  (2006.01)
  *C03B 23/00*  (2006.01)
  *C03B 23/035*  (2006.01)

(52) U.S. Cl.
  CPC ......... *C03B 23/0252* (2013.01); *C03B 23/0026* (2013.01); *C03B 23/0357* (2013.01)

(58) Field of Classification Search
  CPC ............ C03B 23/0252; C03B 23/0026; C03B 23/0066; C03B 23/023; C03B 23/025; C03B 23/03
  USPC .................................. 65/107, 287
  See application file for complete search history.

(56) References Cited

U.S. PATENT DOCUMENTS

| | | | | |
|---|---|---|---|---|
| 2,032,008 A | * | 2/1936 | Galey | 65/348 |
| 3,258,812 A | * | 7/1966 | Willy | 425/471 |
| 3,756,797 A | * | 9/1973 | Akeyoshi et al. | 65/25.4 |
| 4,153,474 A | | 5/1979 | Rex | |

(Continued)

FOREIGN PATENT DOCUMENTS

| DE | 10041271 | 3/2002 |
|---|---|---|
| DE | 202004005198 | 8/2004 |

(Continued)

OTHER PUBLICATIONS

Accuratus, "Aluminum Oxide Al2O3", Published Dec. 8, 2002, http://www.accuratus.com/alumox.html, Accessed Jun. 1, 2013.*

(Continued)

*Primary Examiner* — Cynthia Szewczyk
(74) *Attorney, Agent, or Firm* — Knobbe, Martens, Olson & Bear LLP

(57) ABSTRACT

A sag-bending glass sheet mold is disclosed. The sheet mold comprises a plurality of lateral support members, a plurality of longitudinal support members arranged perpendicular to the lateral support members, each of the plurality of lateral support members extending between two of the plurality of longitudinal support members, each of the plurality of longitudinal support members having an upper surface, and the upper surfaces of each of the plurality of longitudinal support members combined to form a mold support surface. The sheet mold can also comprise a glass-bearing support sheet disposed atop the mold support surface, the glass-bearing support sheet extending across the plurality of longitudinal support members and above the lateral support members, the glass-bearing support sheet having a curved upper surface.

20 Claims, 5 Drawing Sheets

(56) References Cited

U.S. PATENT DOCUMENTS

| | | | |
|---|---|---|---|
| 4,260,409 A * | 4/1981 | Reese et al. | 65/273 |
| 4,323,719 A | 4/1982 | Green | |
| 4,361,433 A * | 11/1982 | Smith et al. | 65/116 |
| 4,373,783 A | 2/1983 | Anderson | |
| 4,456,332 A | 6/1984 | Anderson | |
| 4,468,848 A | 9/1984 | Anderson et al. | |
| 4,468,849 A | 9/1984 | Anderson et al. | |
| 4,481,378 A | 11/1984 | Lesk | |
| 4,502,200 A | 3/1985 | Anderson et al. | |
| 4,640,734 A | 2/1987 | Roberts et al. | |
| 4,643,543 A | 2/1987 | Mohn et al. | |
| 4,643,544 A | 2/1987 | Loughran | |
| 4,678,495 A * | 7/1987 | Yoshizawa | 65/287 |
| 4,759,803 A | 7/1988 | Cohen | |
| 4,973,344 A * | 11/1990 | Rahrig et al. | 65/288 |
| 5,180,441 A | 1/1993 | Cornwall et al. | |
| 5,248,346 A | 9/1993 | Fraas et al. | |
| 5,334,496 A | 8/1994 | Pond et al. | |
| 5,344,496 A | 9/1994 | Stern et al. | |
| 5,389,158 A | 2/1995 | Fraas et al. | |
| 5,409,549 A | 4/1995 | Mori | |
| 5,498,297 A | 3/1996 | O'Neill et al. | |
| 5,580,395 A | 12/1996 | Yoshioka et al. | |
| 5,616,185 A | 4/1997 | Kukulka | |
| 5,660,644 A | 8/1997 | Clemens | |
| 5,697,192 A | 12/1997 | Inoue | |
| 5,865,905 A | 2/1999 | Clemens | |
| 5,899,199 A | 5/1999 | Mills | |
| 5,938,810 A * | 8/1999 | De Vries et al. | 65/268 |
| 5,990,415 A | 11/1999 | Green et al. | |
| 6,034,322 A | 3/2000 | Pollard | |
| 6,131,565 A | 10/2000 | Mills | |
| 6,323,478 B1 | 11/2001 | Fujisaki et al. | |
| 6,359,209 B1 | 3/2002 | Glenn et al. | |
| 6,442,937 B1 | 9/2002 | Stone | |
| 6,553,729 B1 | 4/2003 | Nath et al. | |
| 6,635,507 B1 | 10/2003 | Boutros et al. | |
| 7,240,519 B2 * | 7/2007 | Schwartz et al. | 65/104 |
| 7,468,485 B1 | 12/2008 | Swanson | |
| 7,554,031 B2 | 6/2009 | Swanson et al. | |
| 7,709,730 B2 | 5/2010 | Johnson et al. | |
| 7,820,906 B2 | 10/2010 | Johnson et al. | |
| 7,825,327 B2 | 11/2010 | Johnson et al. | |
| 7,932,461 B2 | 4/2011 | Johnson et al. | |
| 7,952,057 B2 | 5/2011 | Finot et al. | |
| 7,968,791 B2 | 6/2011 | Do et al. | |
| 8,039,777 B2 | 10/2011 | Lance et al. | |
| 8,049,150 B2 | 11/2011 | Johnson et al. | |
| 8,071,930 B2 | 12/2011 | Wylie et al. | |
| 8,083,362 B2 | 12/2011 | Finot et al. | |
| 2004/0074490 A1 | 4/2004 | Mills et al. | |
| 2007/0151598 A1 | 7/2007 | De Ceuster et al. | |
| 2007/0257274 A1 | 11/2007 | Martter et al. | |
| 2008/0035198 A1 | 2/2008 | Teppe et al. | |
| 2009/0056699 A1 | 3/2009 | Mills et al. | |
| 2009/0056785 A1 | 3/2009 | Johnson et al. | |
| 2009/0056786 A1 | 3/2009 | Johnson et al. | |
| 2009/0056787 A1 | 3/2009 | Johnson et al. | |
| 2009/0095284 A1 | 4/2009 | Klotz | |
| 2009/0139557 A1 | 6/2009 | Rose et al. | |
| 2010/0147030 A1 * | 6/2010 | Rietbergen et al. | 65/106 |
| 2010/0154788 A1 | 6/2010 | Wells et al. | |
| 2010/0163014 A1 | 7/2010 | Johnson et al. | |
| 2010/0175740 A1 | 7/2010 | Johnson et al. | |
| 2010/0193014 A1 | 8/2010 | Johnson et al. | |
| 2010/0236626 A1 | 9/2010 | Finot et al. | |
| 2010/0294336 A1 | 11/2010 | Johnson et al. | |
| 2010/0319682 A1 | 12/2010 | Klotz | |
| 2011/0023940 A1 | 2/2011 | Do et al. | |
| 2011/0132457 A1 | 6/2011 | Finot | |
| 2011/0186130 A1 | 8/2011 | Finot et al. | |
| 2011/0226309 A1 | 9/2011 | Do et al. | |
| 2011/0226310 A1 | 9/2011 | Johnson et al. | |
| 2011/0265869 A1 | 11/2011 | Finot et al. | |

FOREIGN PATENT DOCUMENTS

| | | |
|---|---|---|
| GB | 2340993 | 3/2000 |
| JP | 2007184542 | 7/2007 |
| JP | 2007194521 | 8/2007 |
| JP | 2007214247 | 8/2007 |
| KR | 1020070070183 | 7/2007 |
| KR | 1020090014153 | 2/2009 |
| WO | WO9957493 | 11/1999 |
| WO | WO2007096157 | 8/2007 |
| WO | WO2007096158 | 8/2007 |
| WO | WO2008022409 | 2/2008 |
| WO | WO2008153922 | 12/2008 |
| WO | WO2009023063 | 2/2009 |
| WO | WO2009029275 | 3/2009 |
| WO | WO2009029277 | 3/2009 |

OTHER PUBLICATIONS

Bardwell, Karen et al., "Minimizing End Shadowing Effects on Parabolic Concentrator Arrays," IEEE, 1980, pp. 765-770.

Carroll, Don et al. "Production of the Alpha Solarco Proof-of-Concept Array," IEEE, 1990, pp. 1136-1141.

Edenburn, Michael W., et al. "Shading Analysis of a Photovoltaic Cell String Illuminated by a Parabolic Trough Concentrator," IEEE, 1981, pp. 63-68.

Quagan, Robert J., "Laser Diode Heat Spreaders," Ion Beam Milling, Inc., website copyright 2010, http://www.ionbeammilling.com/default.asp, 9 pgs.

Shepard, Jr., N. F. et al., "The Integration of Bypass Diodes with Terrestrial Photovoltaic Modules and Arrays," IEEE, 1984, pp. 676-681.

Stern, T. G., "Interim results of the SLATS concentrator experiment on LIPS-II (space vehicle power plants)," Photovoltaic Specialists Conference, 1988., Conference Record of the Twentieth IEEE , vol., no., pp. 837-840 vol. 2, 1988. URL: http://ieeexplore.ieee.org/stamp/stamp.jsp?tp=&arnumber=105822&isnumber=3239.

Vivar Garcia, Marta, "Optimisation of the Euclides Photovoltaic Concentrator," 2009, 390 pages.

\* cited by examiner

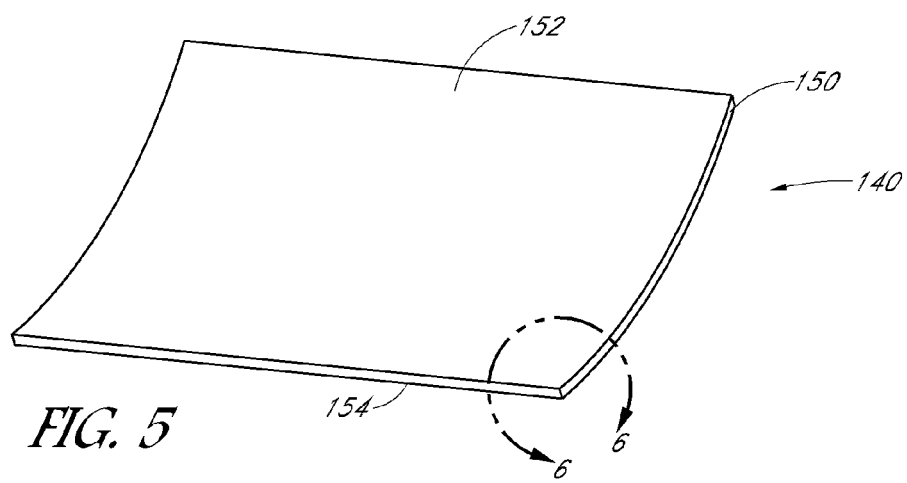
FIG. 5
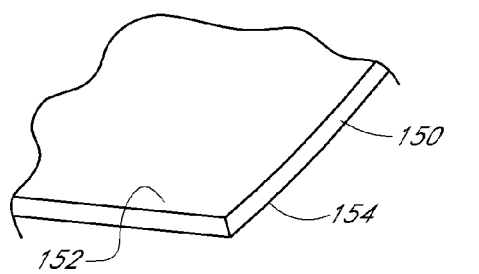
FIG. 6
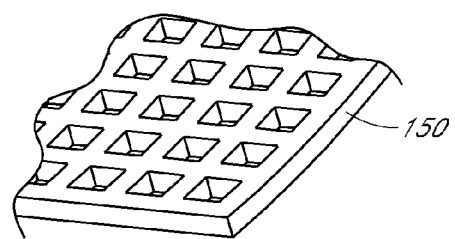
FIG. 7
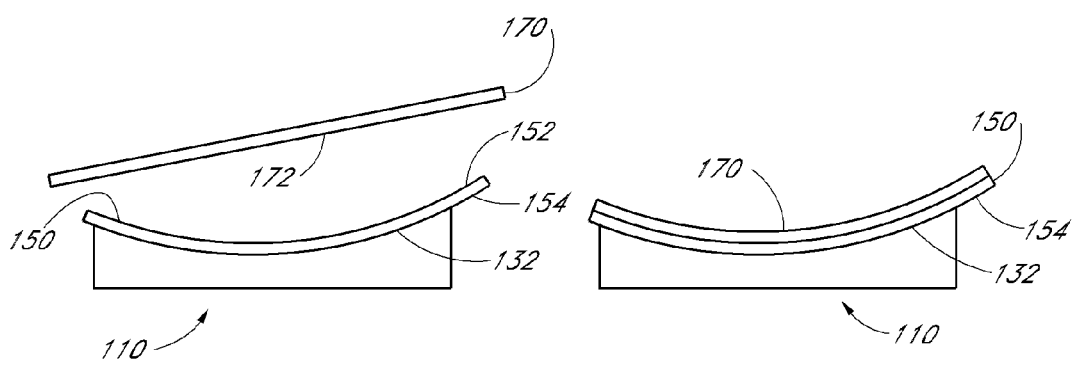
FIG. 8
FIG. 9

GLASS-BENDING APPARATUS AND METHOD

PRIORITY INFORMATION

The present application claims priority under 35 U.S.C. §120 to U.S. Provisional Patent Application No. 61/504,147, filed Jul. 1, 2011, the entire contents of which is hereby incorporated by reference.

TECHNICAL FIELD

Embodiments of the subject matter described herein relate generally to glass bending. More particularly, embodiments of the subject matter relate to bending glass sheets to form mirrors.

BACKGROUND

Shaped glass mirrors can be used in solar concentrating applications, including concentrated photovoltaic (CPV) systems. CPV systems can be designed to use mirrors having any of a variety of shapes, including parabolic-shaped mirrors. CPV systems include a solar receiver upon which concentrated sunlight is directed. Some CPV systems can use a partial parabolic shaped mirror, which is define as a mirror having a curved surface that corresponds to an arc along a parabola. Such an arc need not include the vertex of the parabola.

CPV mirrors have extremely high precision requirements because small deviations from the designed sunlight concentration profile and the desired location of the profile on the solar receiver have a strong negative impact on the power generation of the overall CPV system. Accordingly, the glass mirror bending process should be as free from defect, imperfection, and deformation as possible. Current mirror bending technology relies on sag bending, where a flat glass sheet is heated in a furnace above a rib-based mirror mold. The glass sheet sags when heated under its own weight. The rib-based mold then supports the flexible glass sheet, causing the glass sheet to assume the curved shape of the mold, thereby producing a curved sheet of glass for a mirror.

The rib-based mold is typically constructed of a steel or other similar metal. Such molds, however, produce a mirror with imperfections. Because the glass sheet is a continuous surface and the rib-based mold contacts and supports only portions of the surface, while the remainder of the surface is exposed to the furnace environment, the glass sheet experiences dissimilar rates of thermal expansion and heat transfer between the portions of the sheet contacting the mold and the portions unsupported by the ribs. This arrangement can produce imperfections in the glass sheet. These imperfections later negatively impact the performance of the CPV system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a perspective view of an embodiment of a sheet portion of a sag mold;

FIG. 6 is a detailed view of a corner of the sheet portion embodiment of FIG. 5;

FIG. 7 is a detailed view of a corner of an alternative embodiment of a sheet portion;

FIG. 8 is an end view of an embodiment of an improved sag mold with an adjacent glass sheet;

FIG. 9 is an end view of the embodiment of the sag mold of FIG. 8 with a sag-bent glass sheet in contact with the sheet portion of the sag mold;

DETAILED DESCRIPTION

Figure 1:
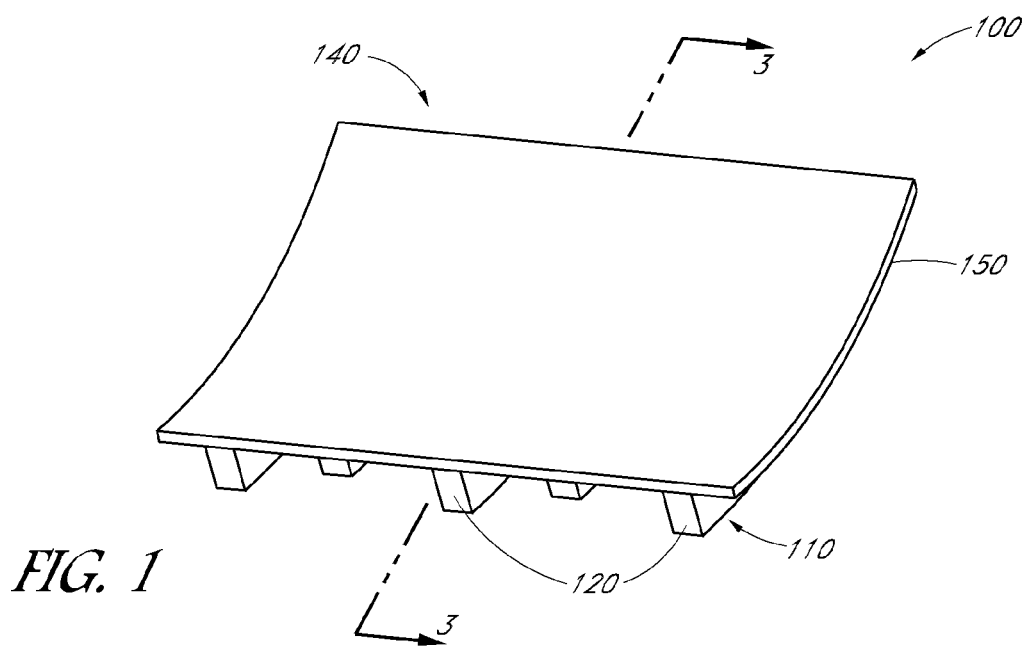
FIG. 1 is a perspective view of an embodiment of an improved sag mold.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown in the figures depict exemplary arrangements of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Two types of improvements can be made to the current technology to improve the performance of, and correspondingly reduce the imperfection formation in, sag-bending molds. In the first class of improvement, an insert can be introduced between the mold and the glass sheet to create a more thermally stable surface onto which the glass sheet can sag when heated. In the second class of improvement, the upper surfaces of the ribs comprising the mold can be coated or otherwise topped with a mediating material to provide a superior thermal interface between the glass sheet and metal ribs forming the mold. The glass produced by sag bending can be silvered or otherwise metalized to produce a mirror suitable for use in CPV applications.

A sag-bending glass sheet mold is disclosed. The sheet mold comprises a plurality of lateral support members, a plurality of longitudinal support members arranged perpendicular to the lateral support members, each of the plurality of lateral support members extending between two of the plurality of longitudinal support members, each of the plurality of longitudinal support members having an upper surface, and the upper surfaces of each of the plurality of longitudinal support members combined to form a mold support surface. The sheet mold can also comprise a glass-bearing support sheet disposed atop the mold support surface, the glass-bearing support sheet extending across the plurality of longitudinal support members and above the lateral support members, the glass-bearing support sheet having a curved upper surface.

Another embodiment of a sag-bending glass mold is disclosed. The glass mold comprises (i) a rectangular perimeter comprising (a) first and second longitudinal members extending in a first direction and first and (b) second lateral members extending in a second direction, the first and second directions substantially perpendicular to each other, each of the first and second longitudinal members coupled to each of the first and second lateral members, a plurality of lateral ribs extending substantially parallel to the second direction, a first of the plurality of lateral ribs coupled to the first longitudinal member and a second of the plurality of lateral ribs coupled to the second lateral member, (ii) a plurality of longitudinal ribs extending substantially parallel to the first direction, a first of the plurality of longitudinal ribs coupled to the first lateral member and a second of the plurality of longitudinal ribs coupled to the second lateral member, each of the plurality of longitudinal ribs coupled to at least one of the plurality of lateral ribs, and (iii) a ceramic sheet above the plurality of lateral ribs and plurality of longitudinal ribs, the ceramic sheet extending across each of the plurality of lateral ribs and across each of the plurality of longitudinal ribs, the ceramic sheet further extending across at least part of each of the first and second longitudinal members and each of the first and second lateral members, the ceramic sheet having a curved upper surface, wherein the ceramic sheet has a coefficient of thermal conduction of at most 100 W/(m·K) and a coefficient of volumetric thermal expansion of at most $10 \times (10-6/K)$.

A method of bending a sheet of glass is also disclosed. The method comprises positioning a substantially flat sheet of glass above a sag-bending mold having a ceramic surface forming an upper surface of the sag-bending mold, increasing the flexibility of the sheet of glass by increasing the temperature of the sheet of glass above a first predetermined temperature, and altering the shape of the sheet of glass to a curved shape by supporting the heated sheet of glass with the ceramic surface.

FIG. 1 illustrates a first embodiment of an improved sag mold 100. The mold 100 comprises a rib portion 110 and a sheet portion 140. The rib portion 110 can be positioned beneath and supporting the sheet portion 140. The rib portion 110 can comprise several longitudinal members 120 and several lateral members 130. The sheet portion 140 can comprise the support sheet 150 positioned above the rib portion 110. The support sheet 150 can support a sheet of glass to sag bend it into a desired curved shape.

Figure 2:
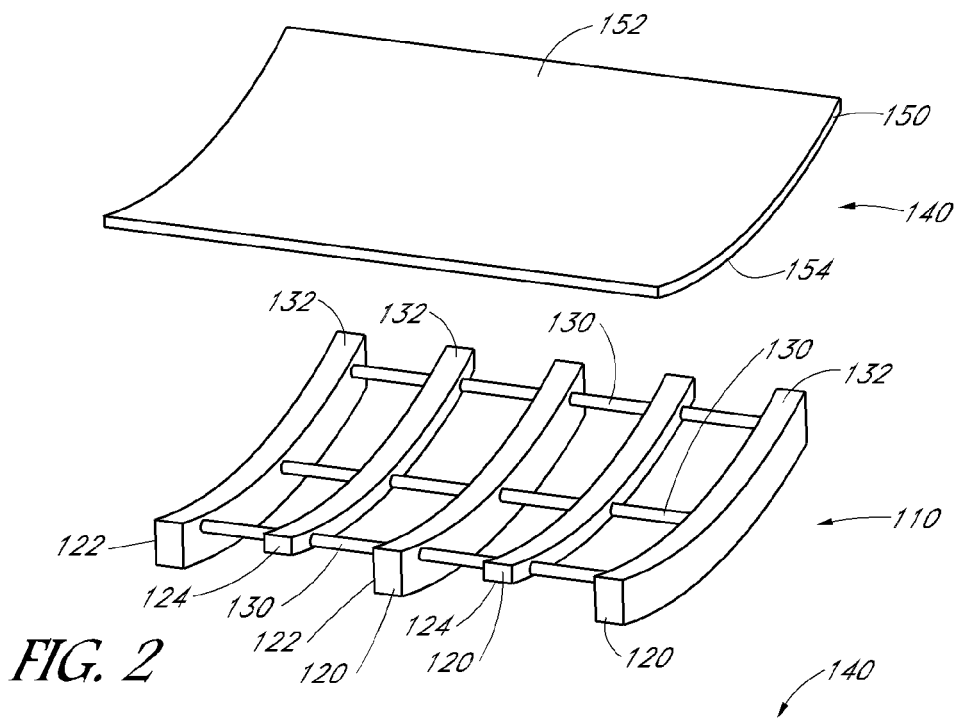
FIG. 2 is an exploded view of the embodiment of the sag mold of FIG. 1.

The rib portion 110 can be seen more clearly in the exploded view of FIG. 2, to which additional reference is made. The longitudinal members 120 can extend substantially the same length though, as can be seen, can have different cross-sectional geometries. For example, the thick longitudinal member 122 can be taller, having a larger height, than the thin longitudinal member 124. Regardless of cross-sectional shape, height, spacing between longitudinal members 120, and other properties of the arrangement of the rib portion 110, the longitudinal members 120 can define an upper surface 132. Although a certain number of longitudinal members 120 of any geometry are shown, more or fewer can be present in any embodiment, from as few as one to as many as desired for any embodiment. When one longitudinal member 120 is present, the lateral members 130 can contribute to the definition of the curved shape of the upper surface 132. Additionally, in those embodiments where the lateral and longitudinal members 130, 120 are reversed, the properties described for any one can be present in the other.

Thus, the terms "longitudinal" and "lateral" are used for reference to the illustrated embodiment and are not intended to limit the types or direction of the members. In other embodiments, the longitudinal and lateral directions may be reversed, but the terms can still be used to refer to support members extending substantially or approximately in perpendicular directions for the purpose of creating the structure of the rib portion 110. The longitudinal and lateral members 120, 130 can have freedom to thermally expand without deforming the shape of the rib portion 100. For example, they can be interconnected using pin-joints or articulated couplings which permit free thermal expansion without deforming the members 120, 130. In some embodiments, gaps or openings can be present to provide space for expansion free from force-transmitting contact with another component.

The upper surface 132 can have a curved shape, including a parabolic or partial parabolic shape, as well as other desired shapes. The upper surface 132 can be formed in a non-parabolic shape as well, including the linear-square composite shape as described in U.S. Provisional Patent Application No. 61/504,147 ("GLASS BENDING METHOD AND APPARATUS"), the entirety of which is explicitly incorporated herein by reference. Accordingly, the upper surface 132, support sheet upper surface 152, sag mold 100, and all other embodiments described herein can be used to produce the shapes described in said application.

Figure 3:
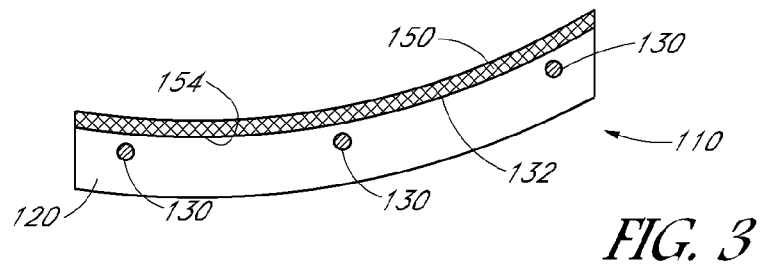
FIG. 3 is a cross-sectional end view of the embodiment of the sag mold of FIG. 1.

Additional reference to FIG. 3 illustrates a cross-sectional view of the sag mold 100 showing a side or end view of the mold 100. The visible longitudinal member 120 is a thick longitudinal member 122 with upper surface 132 having the illustrated curved shape which increases in height from left to right in FIG. 3. Other longitudinal members 120, thick and thin 122, 124, if shown, would have an upper surface 132 in line with the upper surface 132 of the illustrated longitudinal member shown, though these are omitted for clarity. The upper surface 132 can be distributed across and formed, described, and defined by all or most of the longitudinal members 120. Accordingly, the upper surface 132 can be distributed across the entirety or substantially the entirety of the rib portion 110, which can define the upper surface 132.

Figure 4:
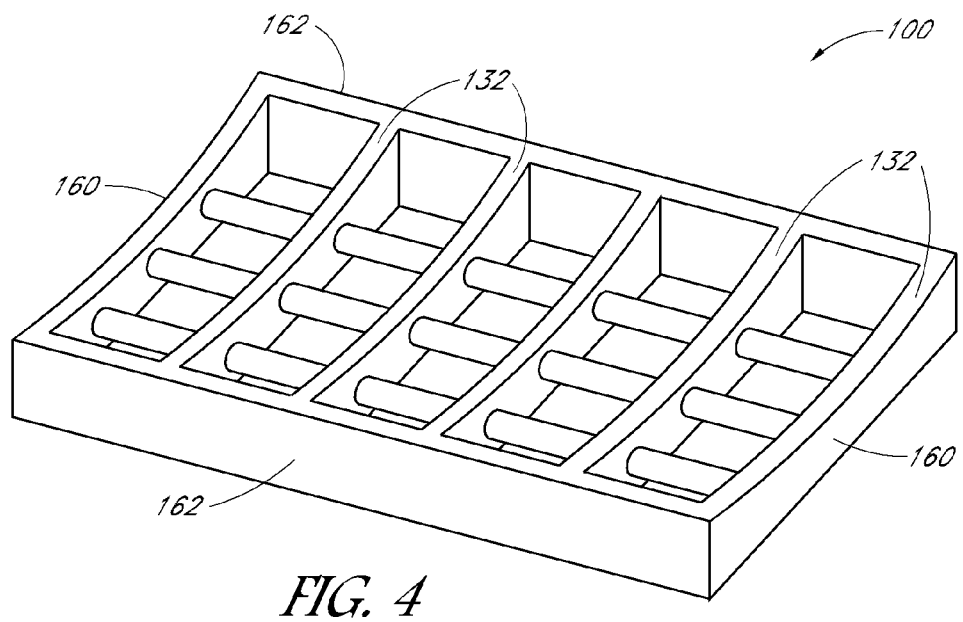
FIG. 4 is a perspective view of an alternative embodiment of a rib portion of a sag mold.

FIG. 4 illustrates an alternative embodiment of a sag mold 100, wherein a perimeter comprised of longitudinal perimeter members 160 and lateral perimeter members 162 form a substantially rectangular shape around the rib portion 110. In the illustrated embodiment, both perimeter members 160, 162 have a height forming part of the curved surface 132. In other embodiments, the longitudinal perimeter members 160, lateral perimeter members 162, or both can have a geometry which places the upper portion of any of them below the upper surface 132, and the remainder of the rib portion 110 contributes to form the upper surface 132.

With reference again to FIGS. 1-3, the lateral members 130 can couple with, couple to, extend through, or connect the various longitudinal members 120. Each illustrated lateral member 130, therefore, can be a single piece which extends the lateral width of the sag mold 100, passing through the interposed longitudinal members 120. In other embodiments, each illustrated, or any present, lateral member 130 is a discrete piece which is coupled to, such as by welding, brazing, or fastening, the longitudinal members 120 it supports. Although three lateral members 130 are shown, more or fewer can be present in any embodiment of the rib portion 110, as desired. Additionally, although the lateral members 130 are not shown forming a part of the upper surface 132, in certain embodiments, the upper surfaces of the lateral members 130 can contributed to the formation of the upper surface 132.

Additional reference is made to FIGS. 5-7 in describing the support sheet 150. The support sheet 150 can rest on the rib portion 110, either without constraint or coupled by a mechanism such as a clip, fastener, interference fit, or other desired technique, including a releasable or detachable system. The support sheet 150 can be sized to fit exactly or nearly exactly on the upper surface 132, overlaying the rib portion 110. In some embodiments, the support sheet 150 can extend beyond the upper surface 132, and therefore its upper surface 152 can have a curved shape extending beyond the portion of the curve used to support a glass sheet during sag bending.

The support sheet 150 can have an upper surface 152 and a lower surface 154. In certain embodiments, the support sheet 150 can be composed of ceramic or another composite, or any other material which embodies the desired characteristics. The support sheet 150 can have a thickness of as few as 0.01 millimeters (mm) or as thick as 3 m. The term "thickness" can also refer to support sheets which comprise vertical legs or standoffs, and when applied to such embodiments, can measure the overall height of the sheet portion in a vertical direction. In such embodiments, the sheet portion can be fairly described using other terms as well, and need not be a thin sheet, as illustrated here.

The support sheet 150 can be flat, such as having a smooth surface with a surface flatness varying by no more than 50 micrometers from the curved surface of the support sheet 150. The support sheet 150 can be thermally stable, having a coefficient of thermal expansion of at most $15 \times (10^{-6}/K)$. Similarly, some embodiments of the support sheet 150 can have a coefficient of thermal conduction of at most 100 W/m·K. In some embodiments, the support sheet 150 can be a ceramic sheet with a thickness of 10 mm, a coefficient of thermal expansion of $5.1 \times (10^{-6}/K)$, and a coefficient of thermal conduction of 3 W/m·K. For example, Alumina 60% can be used in one embodiment.

FIG. 5 illustrates the support sheet 150 in isolation for clarity. In certain embodiments, the support sheet 150 can be a solid sheet, as shown in FIG. 6, which is a detailed view of the corner of support sheet 150. As shown in FIG. 7, in another embodiment, the support sheet 150 can be a mesh or of porous construction. The pitch or size of openings through the support sheet 150 can vary based on the embodiment to any desired value or measure. In certain embodiments, the openings need not extend entirely through the support sheet 150, and can instead be depressions in the upper surface 152.

In some embodiments, the support sheet 150 can be a solid component, while in other embodiments, the support sheet 150 can be of multi-layer construction. In one exemplary embodiment, the support sheet 150 can be a ceramic sheet with a friction-reducing or adhesion-reducing upper layer, such as a fluoropolymer, while in other embodiments, the upper layer can be omitted. One example adhesion-reducing layer can be a synthetic fluoropolymer of tetrafluoroethylene, such as the product mulcted by E. I. du Pont de Nemours and Company ("DuPont") as TEFLON™. In some embodiments, the adhesion-reducing layer can be a consumable, such as a mineral powder or other solid powder. In certain embodiments, the powder, grain, or solid lubricant can have a sintering temperature below the temperature at which glass is sag-bent during the process incorporating the mold 100.

The lower surface 154 can conform to the upper surface 132 of the rib portion 110. Accordingly, the support sheet 150 can be positioned easily on the rib portion 110 on the mating surfaces. The upper surface 152 can support a glass sheet during a sag-bending process, forming the curved shape of the finished bent glass sheet. The support sheet 150 can have a partial parabolic, parabolic, linear, or any other desired curved upper surface 152 which comports to the shape desired for the glass sheet which is to be sag-bent.

FIG. 8 illustrates an arrangement of the sag mold 100 adjacent a flat glass sheet 170. The flat glass sheet 170 has a lower surface 172. When positioned above the sag mold 100 and heated to a first predetermined temperature, the glass sheet 170 can sag to conform to the shape of the upper surface 152 of the support sheet 150, as shown in FIG. 9. Thus, the glass sheet 170 can be formed into a glass sheet having a desired curve shape. Although a glass sheet is described herein, any other material suitable for sag bending can be similarly used. For example, certain polymers can also benefit from the process and advances described herein.

The continuous surface proffered by the support sheet 150 is superior to older sag molds for evenly distributing heat to the glass sheet, minimizing localized deformations caused in the glass sheet being shaped due to either sagging between rib members or heat transfer differential between portions of the glass sheet contacting the metal rib members and those portions exposed to the environment between rib members or discrepancies between ribs due to manufacturing defects.

Figure 10:
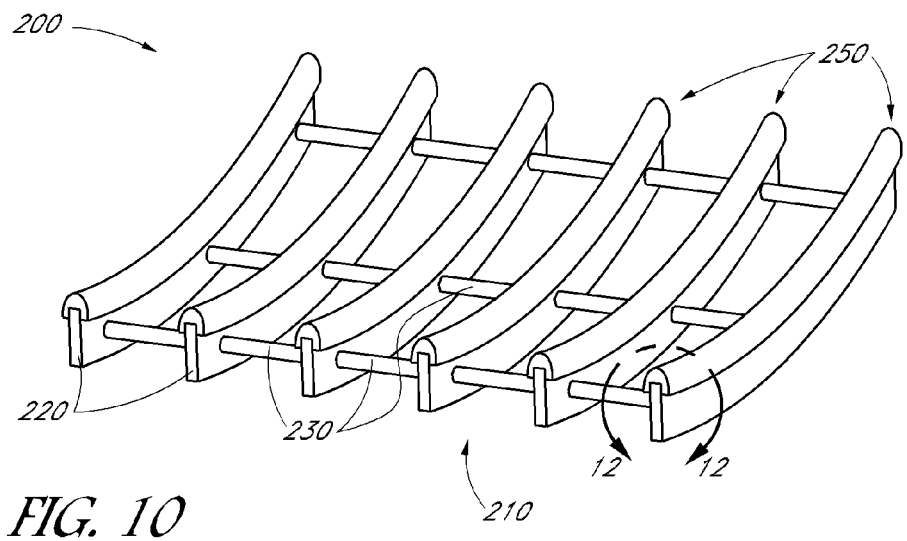
FIG. 10 is a perspective view of another embodiment of an improved sag mold.
Figure 12:
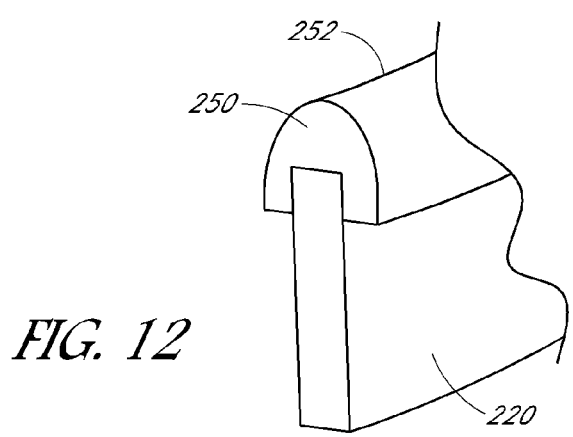
FIG. 12 is a detailed view of a portion of the embodiment of a sag mold of FIG. 10.
Figure 14:
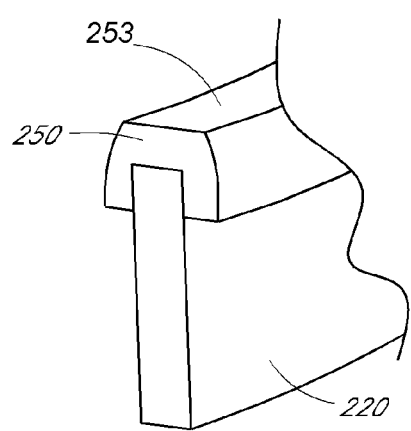
FIG. 14 is a detailed view of another embodiment of a sag mold.
Figure 13:
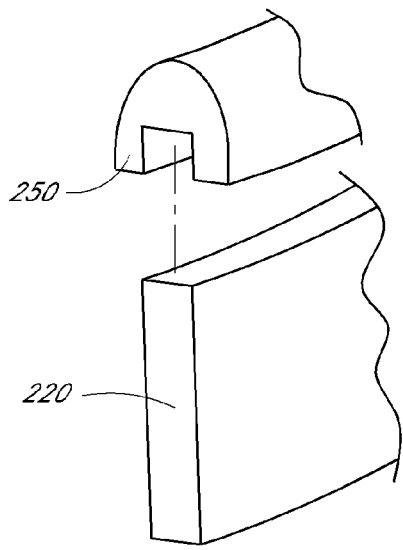
FIG. 13 is an exploded view of the detail portion of FIG. 10.
Figure 15:
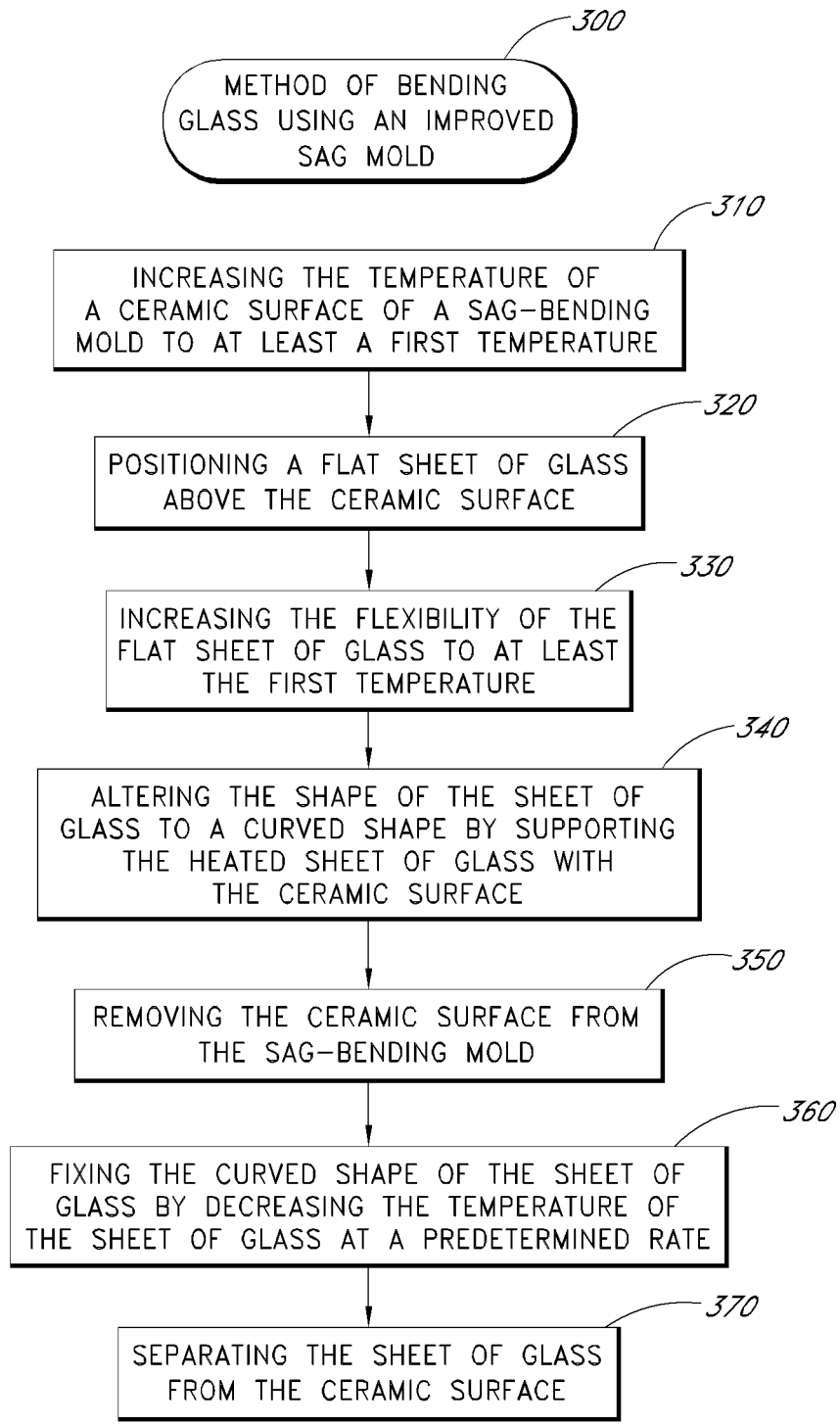
FIG. 15 is a flowchart describing a process for sag-bending glass using an improved sag mold.

Another technique for improving quality of sag-bent glass is providing a capping surface atop the longitudinal and lateral members of a rib portion. The capping surface can provide a thermally-stable surface for contacting the glass sheet, offering superior performance to the metal members which are currently used to contact glass sheets. FIG. 10 illustrates one such sag mold 200.

Although describing a different technique for improving sag-bending mold performance, it should be understood that certain components have similar features and properties to those described above with respect to sag mold 100. For example, the longitudinal and lateral members, though having described differences, have similar properties of upper surface 252 formation, whether by longitudinal member(s), lateral member(s), or a combination thereof, as well as similar properties of orientation, connectedness, etc. Unlike sag mold 100, however, certain variant features are present in sag mold 200, described in FIGS. 10-14, as described below. Thus, unless described differently, components designated by numerical indicators in FIGS. 10-14 are similar to those described above with reference to sag mold 100 and the various embodiments illustrated in FIGS. 1-9, except that the numerical indicator has been incremented by 100.

Sag mold 200 comprises a rib portion 210 and a contact surface 250. The rib portion 210 is comprised of longitudinal and lateral members 220, 230 arranged substantially perpendicularly. The contact surface 250 can be seen in FIG. 12, a detailed view of a portion of FIG. 11, wherein an end of a longitudinal member 220 is shown with the contact surface 250 above. In certain embodiments, the contact surface 250 is positioned atop the lateral members 230, while in still others, it is present on a combination, thus forming the glass-bearing upper surface of the sag mold 200.

The contact surface 250 can be constructed to have properties, characteristics, and dimensions similar to those described above with respect to support sheet 150, if desired. The contact surface 250 can be formed by depositing a material on the upper surface 232 of rib portion 210 to form a curved upper surface 252 which supports glass being sag-bent on the sag mold 200. The contact surface 250 can have a curved cross-section, as shown in the detailed view of FIG. 12 or 13, the latter being an exploded view of the former. In other embodiments, such as that shown in FIG. 14, the contact surface can have a flattened upper surface 253.

The contact surface 250 can provide improved thermal performance, similar to support sheet 150, inhibiting dissimilar thermal transfer rates between the portions of the glass sheets positioned on the sag mold 200 contacting metal rib members and those portions not contacting metal rib members. By providing a thermally stable contact interface between the glass sheet and the contact surface 250, imperfections in the bent glass sheet can be inhibited, minimized in size, or eliminated entirely.

Figure 11:
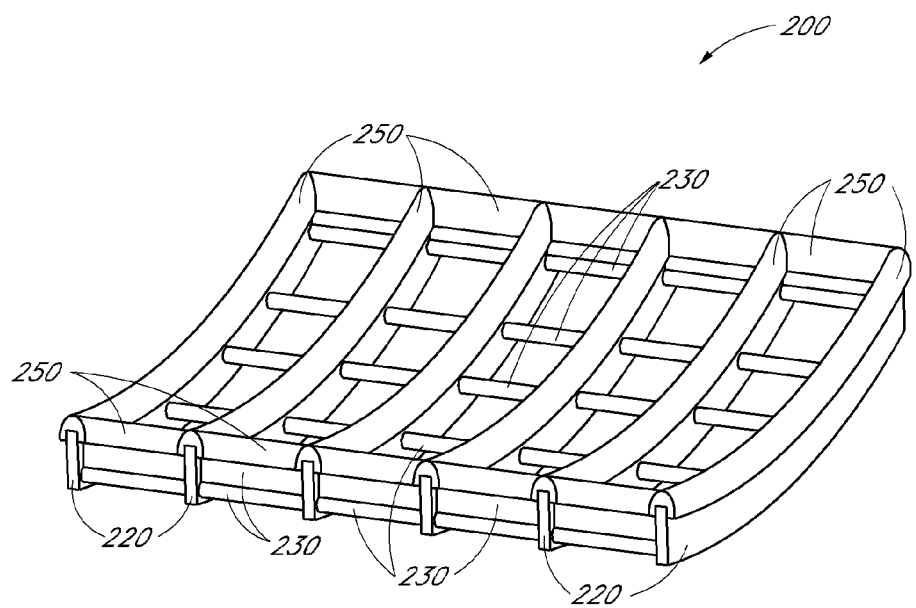
FIG. 11 is a perspective view of another embodiment of the sag mold of FIG. 10.

As with sag mold 100 in an alternative embodiment, the rib portion 210 can be bounded by a perimeter, such as one formed with two perimeter longitudinal members 260 and two perimeter lateral members 262, as shown in the embodiment illustrated in FIG. 11.

For illustrative purposes, the following description of method 300 may refer to elements mentioned above in connection with FIGS. 1-14. In practice, portions of method 300 may be performed by different elements of the described system, e.g., support surface 150, contact surface 250, or sag mold 100, 200. It should be appreciated that method 300 may include any number of additional or alternative steps, the steps shown in FIG. 14 need not be performed in the illustrated order, and method 300 may be incorporated into a more comprehensive procedure or process having additional functionality not described in detail herein.

To bend a flat glass sheet to one having a desired curved surface, a sag mold having a support surface, such as a ceramic surface, can be heated to a predetermined first temperature in a heating device, such as a furnace 310. An exemplary first temperature is 400° Celcius, though any other desired temperature, greater or lesser, can be selected for the particular process, glass sheet dimensions, and other elements of the process. The glass sheet can be positioned above the ceramic upper surface 320, either in the furnace or outside. The temperature of the glass sheet can then be increased to at least the first temperature to increase the flexibility of the glass sheet 330. The shape of the glass sheet can then be adjusted by supporting it on the ceramic surface while in the state of increased flexibility caused by the raised temperature of the glass sheet 340. Thus, the ceramic surface can cause the glass sheet to take a curved shape based on the shape of the upper surface of the ceramic surface, such as a parabolic or partial parabolic shape.

In some embodiments, the ceramic surface can be decoupled from the underlying rib portion 350. In such an embodiment, the ceramic surface can be further processed separately from the rib portion. Such a separation can take place within the heating environment, such as the furnace, or in a post-processing location. In other embodiments of method 300, the ceramic surface can remain coupled to the rib portion. In either case, the curved shape of the glass sheet can be fixed by cooling it 360. As with any glass or metal, the cooling process can determine material properties of the final item. Accordingly, the glass can be cooled using a predetermined rate to produce the desired curved glass sheet for future use.

Regardless of the rate of cooling, detachment of ceramic surface, or location of processing, the curved glass sheet can eventually be separated from the ceramic surface 370.

In this way, a curved glass sheet for use in a mirror can be produced having fewer imperfections than one which is produced using a rib portion alone. Thus, the resulting CPV system incorporating the improved curved glass sheet in a mirror will exhibit superior operating characteristics.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A sag-bending glass sheet mold comprising:
a plurality of lateral support members;
a plurality of longitudinal support members arranged perpendicular to the lateral support members, each of the plurality of lateral support members extending between two of the plurality of longitudinal support members, each of the plurality of longitudinal support members having an upper surface that is curved about a first axis parallel to the lateral support members; and
a capping surface disposed on the upper surface of each longitudinal support member of the plurality of longitudinal support members, each capping surface having a flattened upper surface or a curved upper surface that is curved about a second axis transverse to the first axis, wherein the sag-bending glass sheet mold is adapted to shape a sheet of glass such that, when heated, the sheet of glass sags towards and is shaped by the upper surface of the capping surface.

2. The sag-bending glass sheet mold of claim 1, wherein the upper surface of the capping surface comprises a solid surface.

3. The sag-bending glass sheet mold of claim 1, wherein the capping surface is disposed on an upper surface of each lateral support member of the plurality of lateral support members.

4. The sag-bending glass sheet mold of claim 1, wherein the capping surface has a coefficient of thermal conduction of at most 100 W/(m·K) and a coefficient of volumetric thermal expansion of at most $10 \times (10^{-6}/K)$.

5. The sag-bending glass sheet mold of claim 1, wherein the capping surface is deposited on the upper surface of a corresponding longitudinal member of the plurality of longitudinal members along the entire length and width of the upper surface of the corresponding longitudinal member.

6. The sag-bending glass sheet mold of claim 1, wherein the upper surface of the capping surface is curved.

7. The sag-bending glass sheet mold of claim 6, wherein the curved upper surface of the capping surface comprises a convex surface facing away from the upper surface of the corresponding longitudinal member.

8. The sag-bending glass sheet mold of claim 1, wherein the upper surface of the capping surface is flattened.

9. The sag-bending glass sheet mold of claim 1, wherein the upper surface of at least one longitudinal support member is curved to support a curved lower surface of the capping surface.

10. The sag-bending glass sheet mold of claim 1, wherein the capping surface and each longitudinal member of the plurality of longitudinal members comprise different materials.

11. The sag-bending glass sheet mold of claim 1, wherein the capping surface comprises ceramic.

12. A sag-bending glass mold comprising:
a rectangular perimeter comprising first and second longitudinal members extending in a first direction and first and second lateral members extending in a second direction, the first and second directions substantially perpendicular to each other, each of the first and second longitudinal members coupled to each of the first and second lateral members;
a plurality of lateral ribs extending substantially parallel to the second direction, a first of the plurality of lateral ribs coupled to the first longitudinal member and a second of the plurality of lateral ribs coupled to the second longitudinal member;
a plurality of longitudinal ribs extending substantially parallel to the first direction, a first of the plurality of longitudinal ribs coupled to the first lateral member and a second of the plurality of longitudinal ribs coupled to the second lateral member, each of the plurality of longitudinal ribs coupled to at least one of the plurality of lateral ribs, each of the longitudinal ribs having an upper surface that is curved about the second direction; and
a capping surface disposed on the upper surface of each of the first and second longitudinal members and each of the first and second lateral members, the capping surface on the first and second longitudinal members having a flattened upper surface or a curved upper surface that is curved about the first direction, wherein the capping surface has a coefficient of thermal conduction of at most 100 W/(m·K) and a coefficient of volumetric thermal expansion of at most $10 \times (10^{-6}/K)$,
wherein the capping surface is adapted to shape a sheet of glass such that, when heated, the sheet of glass sags towards and is shaped by the curved upper surface of the capping surface.

13. The sag-bending glass mold of claim 12, wherein the capping surface is disposed on an upper surface of each longitudinal rib of the plurality of longitudinal ribs.

14. The sag-bending glass mold of claim 13, wherein the capping surface is disposed on an upper surface of each lateral rib of the plurality of lateral ribs.

15. The sag-bending glass mold of claim 12, wherein the curved upper surface of the capping surface is shaped to receive a heated, flexible flat sheet of glass and to produce a partial parabolic curve in the heated, flexible flat sheet of glass.

16. The sag-bending glass mold of claim 12, wherein the curved upper surface of the capping surface comprises a surface having an adhesion-reducing coating.

17. The sag-bending glass mold of claim 16, wherein the adhesion-reducing coating comprises a fluoropolymer.

18. The sag-bending glass mold of claim 12, wherein the capping surface comprises ceramic.

19. The sag-bending glass mold of claim 12, wherein at least one of the longitudinal ribs includes an upper surface curved to support a curved lower surface of the capping surface.

20. The sag-bending glass mold of claim 12, wherein the capping surface is deposited on the upper surface of each of the first and second longitudinal members and each of the first and second lateral members.

\* \* \* \* \*